(12) United States Patent
Wade et al.

(10) Patent No.: US 9,449,192 B1
(45) Date of Patent: *Sep. 20, 2016

(54) MAGNETIC STRIPE READER TAMPER PROTECTION

(71) Applicant: Square, Inc., San Francisco, CA (US)

(72) Inventors: Jeremy Wade, San Francisco, CA (US); Max Joseph Guise, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/927,284

(22) Filed: Oct. 29, 2015

Related U.S. Application Data (63) Continuation of application No. 14/296,310, filed on Jun. 4, 2014, now Pat. No. 9,203,546.

(51) Int. Cl.
    G06K 7/08      (2006.01)
    G06K 19/06     (2006.01)
    G06F 21/62     (2013.01)

(52) U.S. Cl.
    CPC .......... G06F 21/6245 (2013.01); G06K 7/087 (2013.01)

(58) Field of Classification Search
    USPC ............... 235/379, 380, 449, 475, 486, 493
    See application file for complete search history.

(56) References Cited

U.S. PATENT DOCUMENTS

| | | | |
|---|---|---|---|
| 6,084,905 A | 7/2000 | Ishifuji et al. | |
| 6,144,800 A | 11/2000 | Kobayashi | |
| 6,230,972 B1* | 5/2001 | Dames | G01V 3/08 235/449 |
| 8,701,997 B2* | 4/2014 | Dorsey | G06Q 20/3567 235/449 |
| 9,203,546 B1 | 12/2015 | Wade et al. | |
| 2002/0060869 A1 | 5/2002 | Sawaguchi et al. | |
| 2005/0218229 A1* | 10/2005 | Morley, Jr. | G06K 7/084 235/449 |
| 2005/0219728 A1* | 10/2005 | Durbin | G06K 7/084 360/46 |
| 2006/0238301 A1 | 10/2006 | Wu et al. | |
| 2007/0131768 A1 | 6/2007 | Wakabayashi | |
| 2007/0293142 A1 | 12/2007 | Dehmas et al. | |
| 2009/0070658 A1 | 3/2009 | Patapoutian et al. | |
| 2010/0034434 A1* | 2/2010 | von Mueller | G07F 7/082 382/119 |
| 2010/0150465 A1 | 6/2010 | Lee et al. | |
| 2010/0244818 A1* | 9/2010 | Atwood | G01N 37/005 324/233 |
| 2011/0135092 A1* | 6/2011 | Lehner | G06K 7/084 380/252 |
| 2012/0002313 A1 | 1/2012 | Miyabe et al. | |
| 2012/0163434 A1 | 6/2012 | Kim et al. | |

(Continued)

OTHER PUBLICATIONS

Non-Final Office Action mailed Feb. 24, 2015 for U.S. Appl. No. 14/296,310 of Wade, J., et al. filed Jun. 4, 2014.

(Continued)

*Primary Examiner* — Tuyen K Vo
(74) *Attorney, Agent, or Firm* — Perkins Coie LLP (57) ABSTRACT

A technique for tamper protection of incoming data signal to an electronic device is disclosed. An intentional interference signal is generated and modulated onto the incoming data signal as one composite input signal, to prevent unauthorized acquisition of valid data from the incoming data signal. The magnitude of the interference signal is adjusted to correspond to the magnitude of the incoming data signal, thereby preventing an attacker from properly differentiating the two different signals and/or decoding the valid data from the composite input signal. Once the composite input signal is safely received within the device, the interference signal can be filtered out in either analog mode or digital mode.

20 Claims, 9 Drawing Sheets

(56) References Cited

U.S. PATENT DOCUMENTS

2014/0070006 A1\* 3/2014 Weldele ................ G06K 7/084
　　　　　　　　　　　　　　　　　　　　　235/449
2014/0211336 A1　7/2014 Liao et al.

OTHER PUBLICATIONS

Notice of Allowance mailed Jul. 29, 2015 for U.S. Appl. No. 14/296,310 of Wade, J., et al. filed Jun. 4, 2014.

\* cited by examiner

MAGNETIC STRIPE READER TAMPER PROTECTION

CROSS REFERENCE TO RELATED APPLICATION

This application is a continuation of U.S. patent application Ser. No. 14/296,310 filed Jun. 4, 2014, entitled MAGNETIC STRIPE READER TAMPER PROTECTION, which is incorporated herein by reference in its entirety.

BACKGROUND

For certain electronic devices, it is particularly important to protect against tampering after the device has been sold or distributed to an end-user. For example, tampering is of particular concern for devices that receive sensitive data from other remote devices to store or process. Such an electronic device often employs data security operations, such as encryption, to ensure that the sensitive data is not exposed to unauthorized entities. Further, such a device may include physical countermeasures, such as a conductive tamper mesh, to deter and/or detect any unauthorized physical access to the electronic components that perform the security operations within the device.

While safeguards such as those described above provide protection to the inner circuitry of the electronic device, they do not necessarily protect the sensitive data at its most vulnerable point, such as during the initial transfer of the data into the device. For example, an attacker could intercept or acquire the sensitive data at the point of device entry before any data security operation can be performed on the data, where a physical countermeasure may be ineffective or impractical.

BRIEF DESCRIPTION OF THE DRAWINGS

One or more embodiments of the introduced technique are illustrated by way of example and not limitation in the figures of the accompanying drawings, in which like references indicate similar elements.

DETAILED DESCRIPTION

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, such references are not necessarily mutually exclusive either.

Introduced here is a technique for providing tamper protection in an electronic device by the intentional introduction of noise into a data signal within the device, to prevent unauthorized acquisition of sensitive data by an unauthorized entity (hereinafter called an "attacker"). In at least some embodiments, the introduced technique can utilize an analog or digital pseudo-random noise signal consisting of a deterministic sequence of pulses that repeats itself after a certain period (while appearing to lack any definite pattern). The use of pseudo-random noise, as opposed to pure random noise, can be advantageous in that the defined "randomness" allows for ease of generating, maintaining, and decoding the "random" sequence at both the transmitting and receiving ends.

According to an embodiment, the technique includes introducing the noise signal within the electronic device, during a data transmission from an external source to the device. The noise signal is combined with the incoming data signal of the transmission to form a composite input signal. The amplitude of the noise signal is adjusted to correspond to the amplitude of the incoming data signal, thereby making it difficult for an attacker to differentiate the two signals and/or to decode the valid data from the composite input signal. Once the composite input signal is safely received at a point within the device where the signal is not vulnerable (or is substantially less vulnerable) to unauthorized acquisition, the noise signal is filtered out in either analog mode or digital mode.

In certain embodiments, the introduced technique can be applied to a card reader that is configured to be coupled as an accessory to a hand-held mobile device. The card reader can read data from a card, such as a credit card or debit card, to forward to the hand-held mobile device for processing. The noise signal can be superimposed onto a data signal indicative of the card's data to protect the data from being acquired by an attacker during the transmission of the data to the card reader.

The introduced technique is advantageous in that it masks the incoming sensitive data with noise at the very first point of data reception from the external source. Hence, any attempt by the attacker to tamper or acquire the sensitive data of the incoming signal is effectively prevented by the technique introduced here. Furthermore, the introduced technique can be combined with other tamper protection techniques, such as encryption, to enhance the security of the sensitive data, from pre-processing (i.e., input of signal into the device) to post-processing (i.e., output of signal to another device).

In accordance with at least some embodiments of the technique, an amplifier is coupled to a signal generator and is configured to amplify the incoming data signal for processing. The signal generator generates and injects a noise signal onto the incoming data signal at an input of the amplifier, resulting in a composite signal that prevents an attacker from reading the valid data. To render it more difficult for the attacker to differentiate the noise signal from the authentic data signal, an automatic gain control circuit is further coupled to the signal generator to adjust a gain of the noise signal, to cause a magnitude of the noise signal to be commensurate with the magnitude of the incoming signal.

In some embodiments, the signal generator facilitates analog filtering of the noise signal by working in coordination with the amplifier to utilize the amplifier's common mode rejection capability. In such embodiments, the signal generator introduces the noise signal into both inputs of the amplifier, resulting in the noise signal being filtered out by the amplifier's common mode rejection property, such that the amplifier produces an output signal that includes only the originally received data signal.

In some embodiments, the noise signal is removed after the amplifier produces the (unfiltered) output signal by use of digital filtering (e.g., decoding). In such embodiments, the technique includes a processor configured to trigger the signal generator to generate the noise signal. In particular, the processor can control various parameters of the noise signal being generated by the signal generator, such as timing (e.g., when to trigger), frequency, randomness, etc. Having knowledge of such parameters, the processor can decode the unfiltered output signal from the amplifier (i.e., composite signal) at a downstream point from the output.

In certain embodiments, the introduced technique can be applied in a card reader that is configured to be coupled as an accessory to a hand-held mobile device, to read data from a payment card, such as a credit card, debit card, automatic teller machine (ATM) card, or the like. A payment card reader of this type generally includes a read head configured to read data from a magnetic stripe of a payment card during a card swipe. The read head reads the information as an analog data signal, and transfers this data signal to another electronic component within the card reader for processing. During this transmission process, the data signal may be subject to possible acquisition by an attacker due to the configuration of the read head. The read head typically has to be at a specific geometry that is physically located away from the card reader's other electronic components, which are located within a secured circuitry area (e.g., security provided by existing tamper protection mechanisms). As such, the sensitive information is potentially subject to tampering from the point of receipt until the point of arrival at the secured circuitry area of the payment card reader. Accordingly, the introduced technique can make the tamper protection provided by the payment card reader more robust.

Note that while the introduced technique is discussed in conjunction with a conventional magnetic stripe payment card reader, the technique can be applicable to other types of card readers, i.e., card readers that read other types of cards, such as smart cards, for example. Accordingly, the term "swipe" as used here refers to an action of reading data from a card, including reading a magnetic stripe, reading a smart card integrated circuit (IC) chip, reading an optical pattern, etc. These features and aspects are discussed further below in connection with the accompanying figures.

Figure 1:
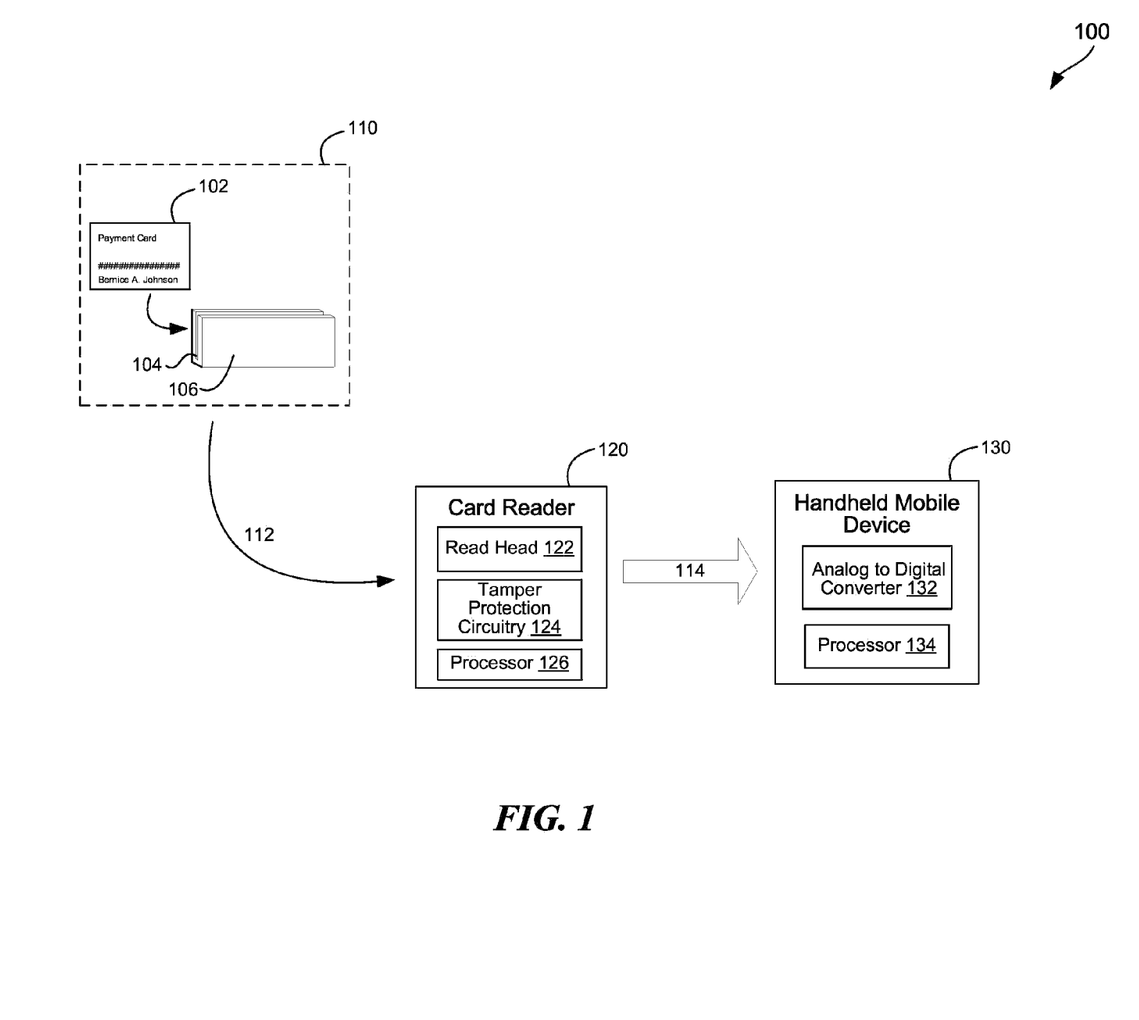
FIG. 1 conceptually illustrates a method of operation of a card reader device having built-in tamper protection.

FIG. 1 conceptually illustrates a method of operation 100 of a card reader device 120 (hereinafter, "card reader 120") having built-in tamper protection, in accordance with the introduced technique. The card reader 120 includes a read head 122, a tamper protection circuitry 124, and a processor 126. Note that FIG. 1 omits certain components of the card reader 120 that are not germane to the present discussion. As such, the card reader 120 may have additional components, such as one or more external connectors, input/output (I/O) devices, and/or a processor (all of which are not shown), to enable the card reader 120 to connect to another electronic device (e.g., a handheld mobile device 130) and/or to a user, or other components that enable the card reader 120 to perform various functionalities. As noted above and further described below, the introduced technique can be implemented in essentially any type of electronic device, and is not limited to a card reader.

The method of operation 100 starts with a card swipe 110, in which a payment card 102 is swiped through a slot 104 of a housing 106 of the card reader 120, according to an embodiment. Informational content is read from the payment card 102 during the card swipe 110 by the card reader 120 (i.e., step 112). In particular, at step 112, the card reader 120 reads the informational content of the payment card 102 and produces a data signal that corresponds to the informational content. The card reader 120 then provides the data signal to a handheld mobile device 130 for further processing at step 114.

The card reader 120 can be coupled to the handheld mobile device 130 via, for example, a headphone jack connection (not shown). The read head 122 enables the card reader 120 to read the informational content stored on the payment card 102. The read head 122 includes one or more channels for reading data from one or more data tracks of the payment card 102. The number of channels is configured during a manufacturing process of the card reader 120, where the number of channels defines the number of data tracks from which the card reader 120 is able to read data. A read head with two channels, for example, is capable of reading data from two different data tracks of a card. A particular channel of the read head is facilitated by a flexible printed circuit (e.g., flexible circuit 200 of FIG. 2). In some instances, a read head may include only one channel in order to reduce the size and structural complexity of the read head (e.g., a compact read head within a miniaturized card reader). In such instances, the card reader 120 may include multiple read heads with only one channel, where the combination of the multiple read heads allow for reading of multiple data tracks. For the sake of simplicity, note that the present discussion focuses on only one read head capable of reading only one data track (e.g., read head having one channel). Further, note that the circuitry coupled to the read head 122 in the present discussion (e.g., flexible circuit 200 and tamper protection circuitry 124) can be replicated for each additional read head of the card reader 120.

According to an embodiment, the tamper protection circuitry 124 is coupled to the read head 122 of the card reader 120 to facilitate tamper protection. In particular, the tamper protection circuitry 124 causes generation of a noise signal, where the noise signal is combined with the data signal incoming from the card swipe 110 (i.e., "incoming data signal") to facilitate the tamper protection. The noise signal can be overlaid, or superimposed, on the incoming data signal to prevent an attacker's machine from "eavesdropping" on the data transmission and acquiring the information content of the data signal. The noise signal can be filtered out by analog or digital filtering before the original data signal gets transmitted from the card reader 120 to a remote device.

According to the embodiment, the noise signal can be any pseudo-random analog or digital signal that consists of a deterministic sequence of pulses that repeats itself after a certain period (while appearing to lack any definite pattern). An example pseudo-random analog noise signal is a Gaussian white noise signal. An example pseudo-random digital noise signal is a pseudo-random bit sequence. Generation of the digital noise signal can be controlled by a processor (e.g., processor 126). The generated digital noise signal can then be superimposed on the incoming data signal indicative of data read by the card reader 120. It is noted that while the incoming data signal is an analog signal, the data signal resembles a digital signal pattern, where the signal increases to a certain magnitude then decreases until it normalizes to a zero direct current (DC) (or continue to decrease depending on the polarity of the magnetic field when the card is swiped passed the read head 122). Accordingly, in an instance where the noise signal is a digital signal, the bits of the digital signal appear similar to the actual magnitude values of the data signal. In such instance, the processor (e.g., the processor 126), with knowledge of the characteristics of the noise signal, can perform digital filtering by removing the bits associated with the noise signal.

The handheld mobile device 130 receives the informational content of the payment card 102 in the form of a filtered data signal (i.e., without the noise signal) from the card reader 120 at step 114. The handheld mobile device 130 typically includes an analog to digital converter (ADC) 132 and a microprocessor 134. The ADC 132, coupled to the microprocessor 134, converts the analog data signal received from the card reader 120 to a digital signal for processing. For example, the handheld mobile device 130 utilizes the digital signal to execute a payment transaction based on the information content carried by the digital signal.

Figure 2:
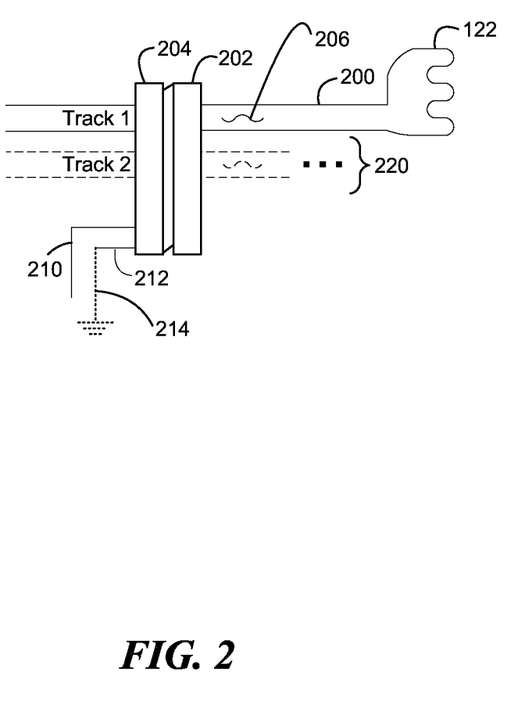
FIG. 2 conceptually illustrates an example of electrical components of a read head of the card reader device to facilitate understanding of the tamper protection technique introduced here.

FIG. 2 conceptually illustrates an example of electrical components of the read head 122. In the illustrated embodiment, a flexible printed circuit element 200 (hereinafter, "flexible circuit 200") includes a flexible circuit cable connector socket 202 that is electrically coupled, or connected, to a sockets interface 204. The flexible circuit 200 is coupled to the read head 122 to facilitate reading of information from a data track of a card. As discussed in FIG. 1, the components 200, 202, and 204 are replicated for each additional read head of the card reader 120, as indicated by components 220. The read head 122 typically includes a coil wound around a magnetic core that can be utilized, along with the flexible circuit 200, to communicate data 206 stored on the card (e.g., on "Track 1") during the card swipe 110 via slot 104. In some embodiments, the flexible circuit 200 facilitates extraction of the informational content by generating an analog waveform (i.e., an analog data signal indicative of that information) that results from changes in magnetization along the magnetic stripe (of the card) relative to the movement between the read head 122 and the stripe. The magnitude of the data signal can vary based on the card swipe 110 (e.g., motion, speed, etc.).

The flexible circuit 200 has a terminal 210 and a terminal 212 for connecting and forwarding the signal to components of the card reader 120 for further processing. In a conventional card reader circuitry, the terminal 210 delivers the signal to an input terminal of the card reader 120 while the terminal 212 is tied to ground (via connection 214). In accordance with the introduced technique, however, the terminal 212 is electrically coupled to the tamper protection circuitry 124 instead of ground (i.e., connection 214 is removed). Through the connection to the tamper protection circuitry 124, an interference signal (e.g., noise signal) can be intentionally introduced and combined with the data signal to facilitate tamper protection. The tamper protection circuitry 124 can adjust the interference signal to make sure that the magnitude of the interference signal commensurate with the incoming data signal generated by the flexible circuit 200A. Accordingly, such overlaying of the interference signal would render it difficult for an attacker to obtain the data signal originally transmitted by the flexible circuit 200A. The composite signal, which includes the interference signal and the original data signal, can be filtered in analog mode or digital mode, depending on the embodiment of the tamper protection circuitry 124. Various embodiments of the tamper protection circuitry 124 are discussed below in relation to FIGS. 3A-3D.

Figure 3A:
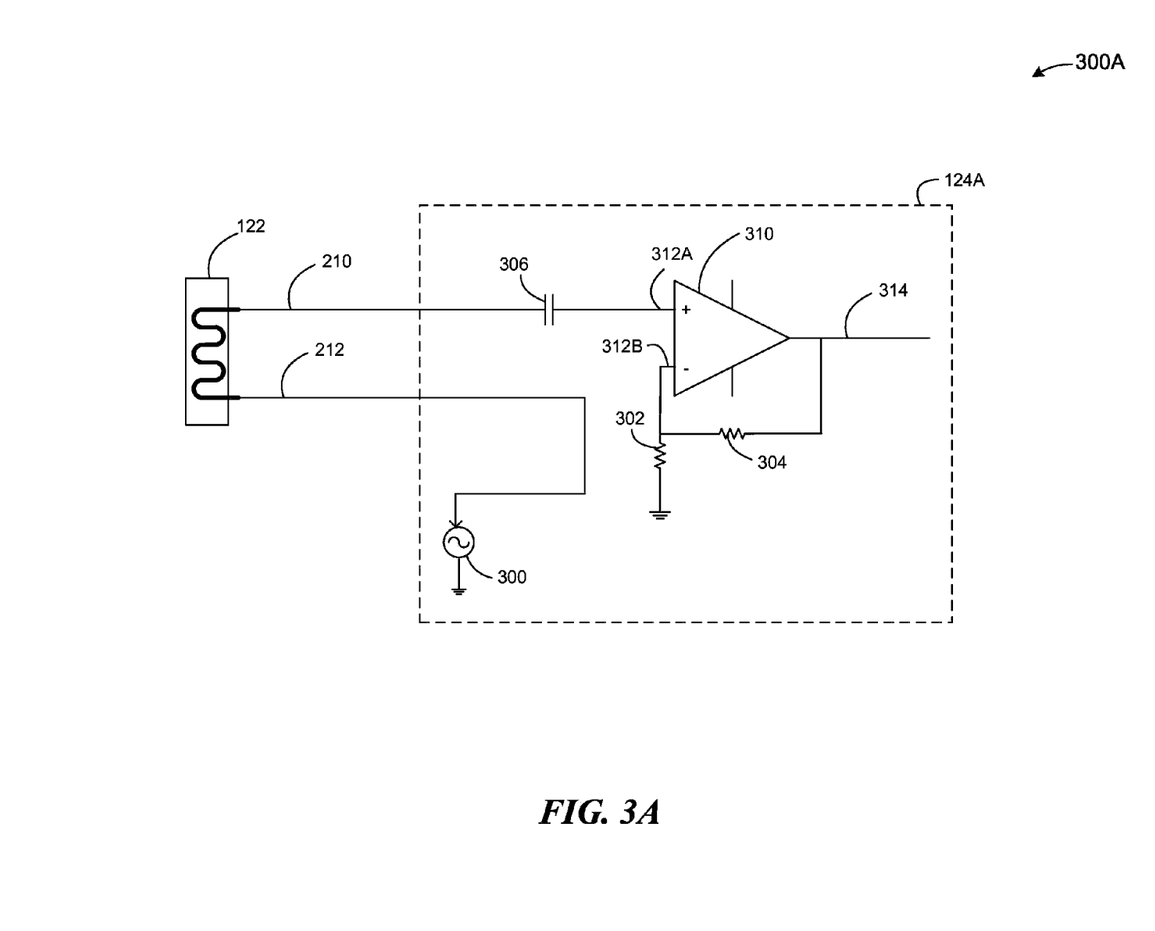
FIG. 3A-3D are schematic diagrams that conceptually illustrate examples of a tamper protection circuitry that can be used to implement the tamper protection technique.

FIG. 3A is a schematic diagram that conceptually illustrates a first example of a tamper protection circuitry 124A that can be used to implement the technique introduced here, in accordance with an embodiment. The illustrated embodiment includes the read head 122 and the tamper protection circuitry 124A. The tamper protection circuitry 124A includes a signal generator 300 and an amplifier 310. The signal generator 300 is configured to generate an interference signal, such as a noise signal. In one example, the noise signal is a pseudo-random bit sequence generated by a signal generator that is, for example, a digital chip. In another example, the noise signal is Gaussian noise generated by a signal generator that is, for example, an analog chip. It is noted that a different signal generator can be utilized for each read head of the electronic device to prevent an attacker from leveraging the signal generators to analyze, identify, and remove the noise signal. For example, if the same two noise signal generators are used, the attacker could use the noise signal and information collected on the first generator to remove the noise signal generated by the second generator.

The amplifier 310 is electrically coupled to the signal generator 300 to facilitate tamper protection. The amplifier 310 has a first input terminal 312A (e.g., non-inverting input), a second input terminal 312B (e.g., inverting input), and an output terminal 314. The amplifier 310 can be any conventional differential amplifier circuit (e.g., op-amp). As illustrated in FIG. 3A, the amplifier 310 is a conventional non-inverting differential amplifier with a negative feedback loop having resistors 302 and 304. A capacitor 306 is added to the conventional form of the amplifier 310 to assist the amplifier 310 in measuring the change in voltage at the input 312A, where the change in voltage is affected by the incoming signal passed through the terminal 210 from the read head 122. The amplifier 310 amplifies the incoming signal (via the input 312A) to produce an output signal at the output terminal 314 for further processing.

According to the embodiment, the signal generator 300 superimposes an interference signal onto the incoming data signal that is received from the swipe at the first input 312A (e.g., non-inverting input). If an attacker attempts to acquire data from the incoming signal at any point during reception of the signal (e.g., during card swipe), the attacker will detect only a composite signal that includes a combination of the interference signal and the incoming signal, instead of the actual incoming signal alone. Introduction of such interference signal is advantageous as it protects the incoming data signal at its vulnerable stage, i.e., during reception from the external source. Once the incoming signal arrives safely in the amplifier 310, other tampering protection mechanisms can be utilized to protect the sensitive data of the data signal, such as encryption or physical tamper meshes.

In some embodiments, analog filtering can be utilized to remove the interference signal from the composite signal. In some such embodiments, the signal generator 300 introduces the interference signal to both inputs of the amplifier 310 (i.e., inputs 312A and 312B) to activate the amplifier's common mode rejection capability. That is, the amplifier 310, in its normal mode of operation, is configured to reject any signals that are common to both input terminals of the amplifier 310 (i.e., common mode rejection), where the resulting signal at the output terminal 314 corresponds to the difference between the two inputs. Accordingly, the signal produced at the output 314 is a filtered signal that contains only the data signal originally received from the card swipe, which is applied to only one of the inputs of the amplifier and therefore represents the difference between the two inputs.

Figure 3B:
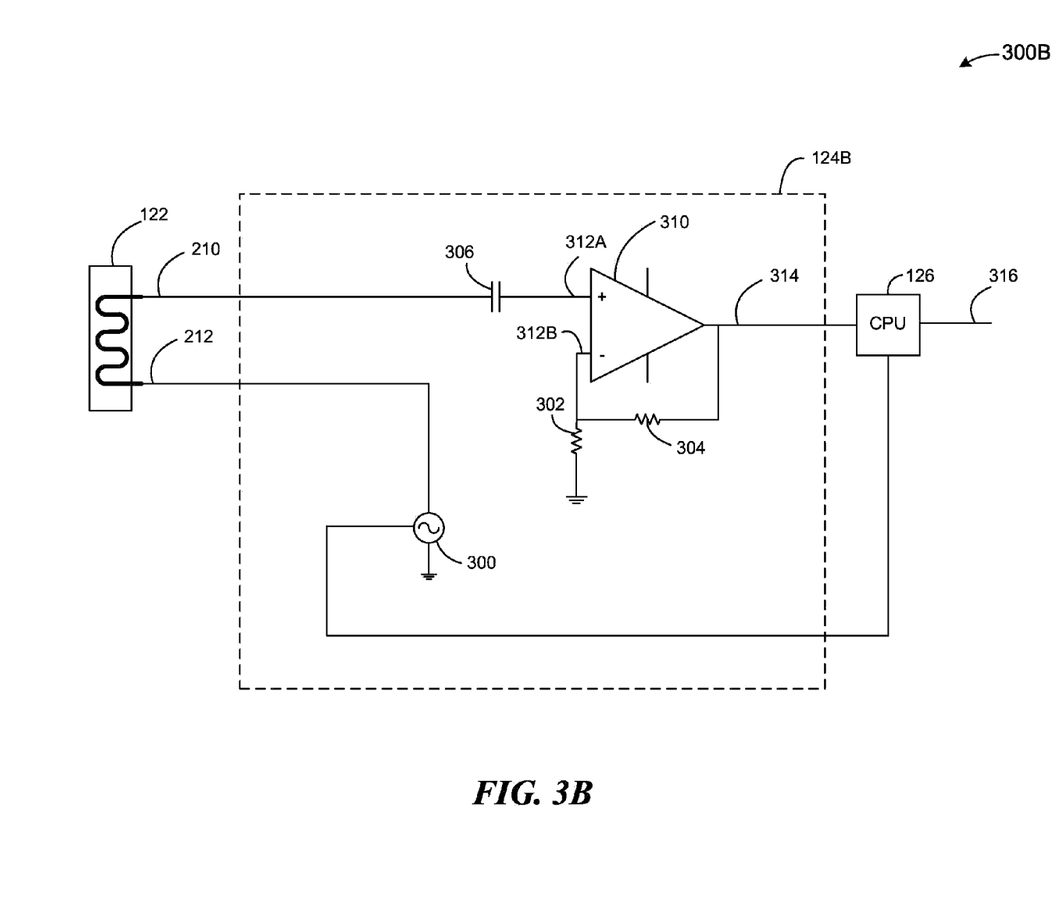

FIG. 3B is a schematic diagram that conceptually illustrates a second example of a tamper protection circuitry 124B that can be used to implement the technique introduced here, in accordance with an embodiment. The tamper protection circuitry 124B includes the signal generator 300 and the amplifier 310. According to the embodiment of FIG. 3B, the tamper protection circuitry 124B is coupled to the processor 126 (of FIG. 1), where the processor 126 can be a central processing unit (CPU). The processor 126 will be referred to as "CPU 126," as shorthand in the following description of FIG. 3B.

According to the embodiment, the CPU 126 is coupled to the signal generator 300 of the tamper protection circuitry 124B to trigger generation of the interference signal. The CPU 126 can specify certain parameters of the interference signal for the signal generator 300 to generate different noise patterns. For example, the CPU 126 can control the values of the parameters relating to any one or more of timing (e.g., when to generate the interference signal), randomness (e.g., repetition of the pseudo-random bits), frequency, spectrum, magnitude, etc. Further, the CPU 126 can specify different sets of parameters for interference signals. For example, an interference signal created for the "track 1" data signal can be different from the interference signal created for the "track 2" data signal. This can be advantageous, for example, in preventing an attacker from extracting the sensitive data by recording, or obtaining, both "track 1" and "track 2" data signals to compare and filter out the matching interference signal. In some embodiments, the CPU 126 can store the parameter values specified to the signal generator 300 for use in other operations. For example, the CPU 126 can use the stored information in decoding the composite signal received at the output terminal 314 to retrieve the original incoming data signal and to generate a "filtered" output signal at a CPU output terminal 316.

Figure 3C:
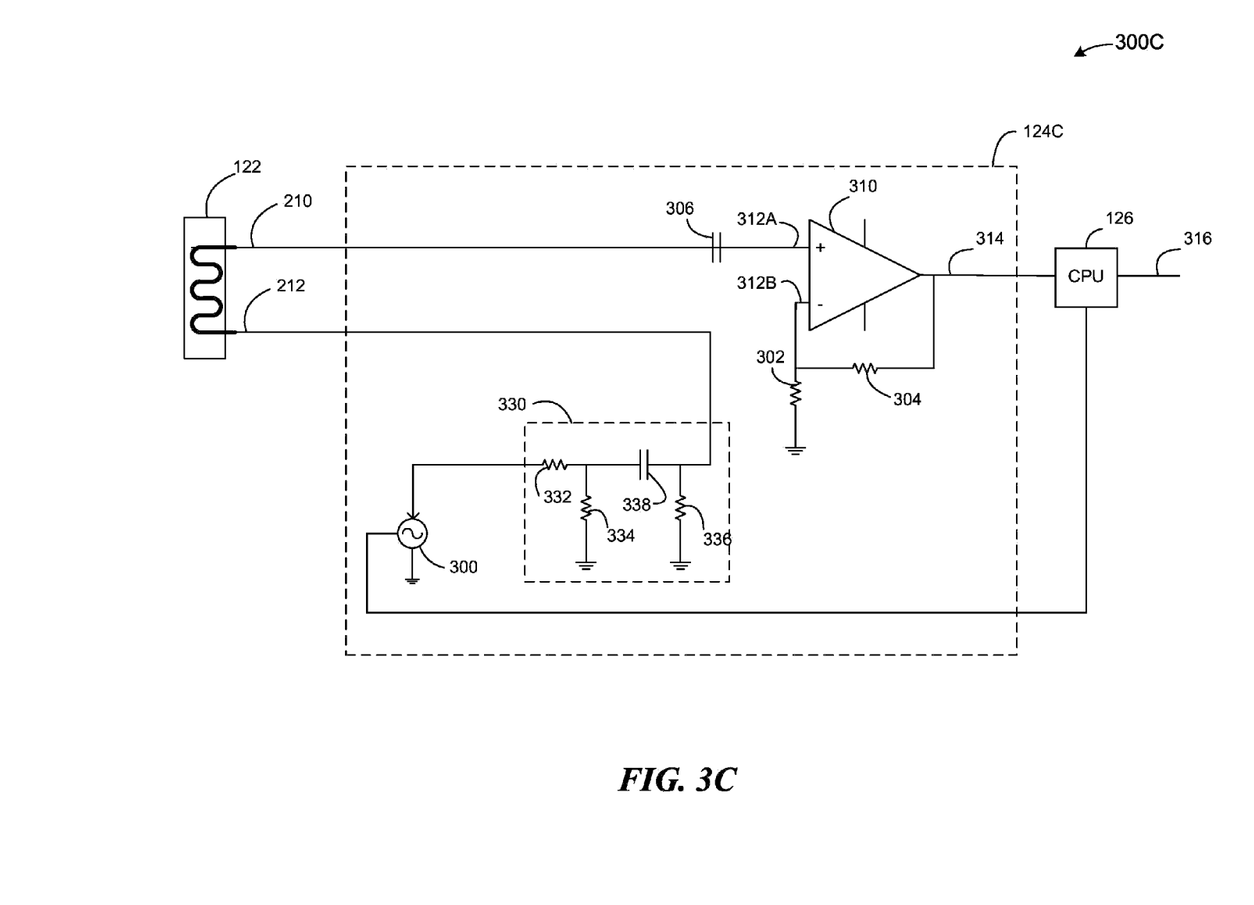

FIG. 3C is a schematic diagram that conceptually illustrates a third example of a tamper protection circuitry 124C that can be used to implement the technique introduced here, in accordance with an embodiment. The tamper protection circuitry 124C includes the signal generator 300, the amplifier 310, and a configuration circuit 330. In the embodiment of FIG. 3C, the tamper protection circuitry 124C is coupled to the processor 126 (of FIG. 1), where the processor 126 can be a central processing unit (CPU). The processor 126 will be referred to as "CPU 126," as shorthand in the following description of FIG. 3C.

The configuration circuit 330 includes a resistor divider (with resistors 332, 334) in series with a high-pass filter (with resistor 336 and capacitor 338). The configuration circuit 330 enables configuration of circuitry behavior associated with the tamper protection circuitry 124C. In some instances, the configuration circuit 330 can modify or adjust the interference signal generated by the signal generator 300. For example, where the interference signal is a digital signal having a square wave input signal, the high pass filter components (336, 338), along with the resistor divider components (332, 334), the configuration circuit 330 can convert the digital signal (in a square wave form) into an analog signal with high frequency spikes. In some instances, the configuration circuit 330 enables the signal generator 300 to work in coordination with the amplifier 310 by having component values (e.g., resistance values of resistors 332 and 334) that correspond to the specifications of the amplifier 310.

Similar to the embodiment of FIG. 3B, the CPU 126 is coupled to the signal generator 300 of the tamper protection circuitry 124C to trigger generation of the interference signal. The CPU 126 can specify certain parameters of the interference signal for the signal generator 300 to generate different noise patterns, such as timing, randomness, frequency, spectrum, magnitude, etc. In some embodiments, the CPU 126 can store the parameter values specified to the signal generator 300 for use in other operations, such as performing digital filtering of the interference signal to generate a filtered output signal at the CPU's output terminal 316.

Figure 3D:
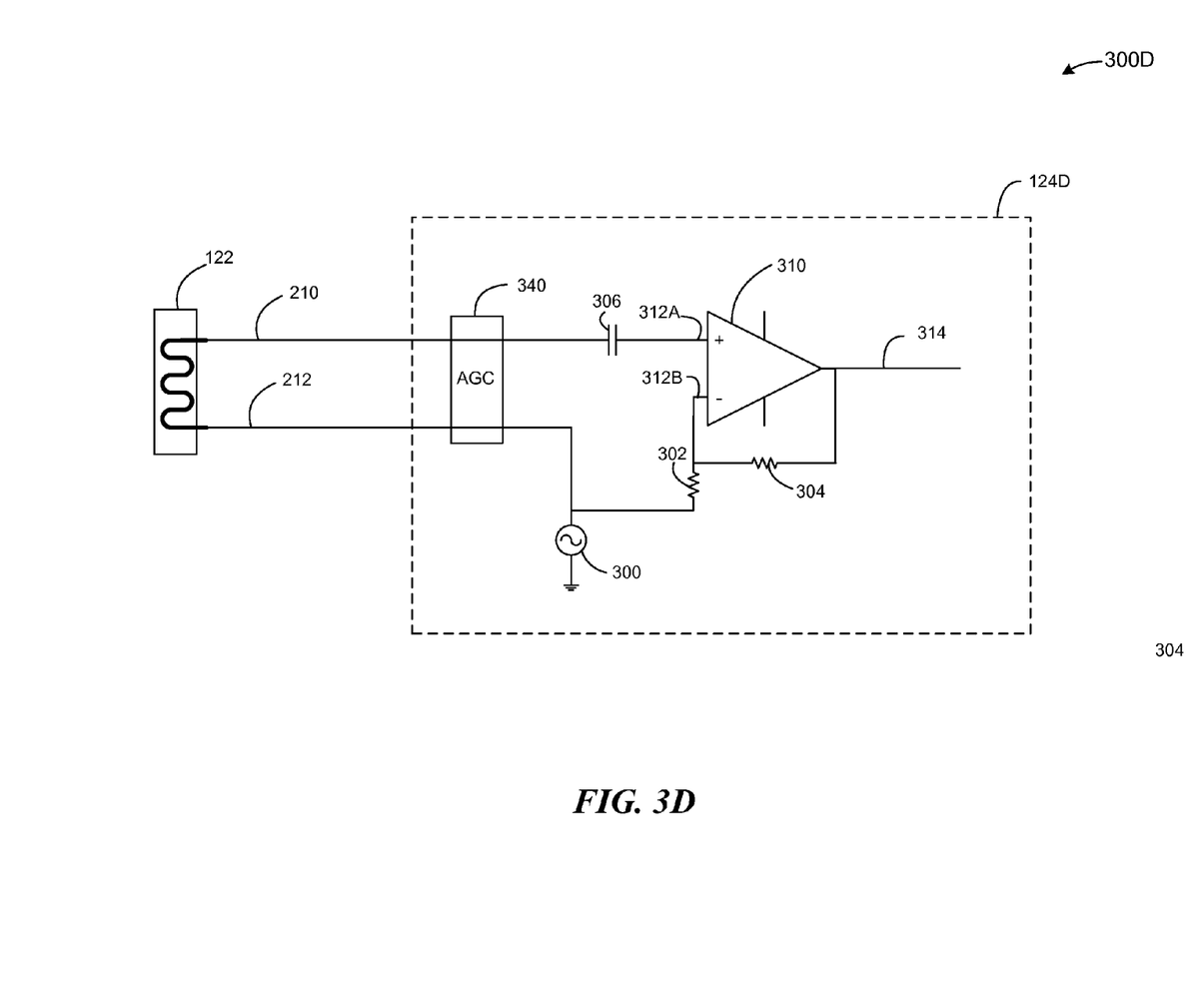

FIG. 3D is a schematic diagram that conceptually illustrates a fourth example of a tamper protection circuitry 124D that can be used to implement the technique introduced here, in accordance with an embodiment. The tamper protection circuitry 124D includes the signal generator 300, the amplifier 310, and an automatic gain control circuit 340.

The automatic gain control (AGC) circuit 340 is coupled to the signal generator 300 to adjust a gain of the interference signal. Such gain adjustment enables the magnitude of the interference signal to be commensurate with, or correspond to, the magnitude of the incoming data signal, rendering it difficult for an attacker to distinguish between the two signals. The AGC circuit 340 can adjust the gain quickly (e.g., on a micro level) in response to the change in magnitude of the incoming data signal. The ability to adjust the gain quickly is beneficial, for example, in a card swipe of a conventional magnetic card. In such an example, the magnitude of the incoming data signal can vary based on the speed of the card swipe, and the magnitude of the interference signal can change to correspond, or match, with the incoming data signal. Use of the AGC circuit 340 prevents an attacker from identifying the interference signal by observing the amplitude differences between a "fast" swipe and a "slow" swipe. The tamper protection circuitry 124D may be utilized in combination with the CPU 126 in a similar manner discussed in FIG. 3B and FIG. 3C. For example, the AGC circuit 340 can be used in combination with the CPU 126 to control the interference signal, where the AGC circuit 340 may be responsible for adjusting the amplitude of the interference signal while the CPU 126 controls the randomness of the interference signal. Further, as shown in FIG. 3D, the common mode rejection capability of the amplifier 310 can be used in the tamper protection circuitry 124D in a manner similar to that discussed in relation to FIG. 3A, e.g. by applying the interference signal controlled by the AGC circuit 340 to both inputs of the amplifier 310. Alternatively, the tamper protection circuitry 124D may not utilize common mode rejection in the sense of what is actually shown in FIG. 3A.

Figure 4:
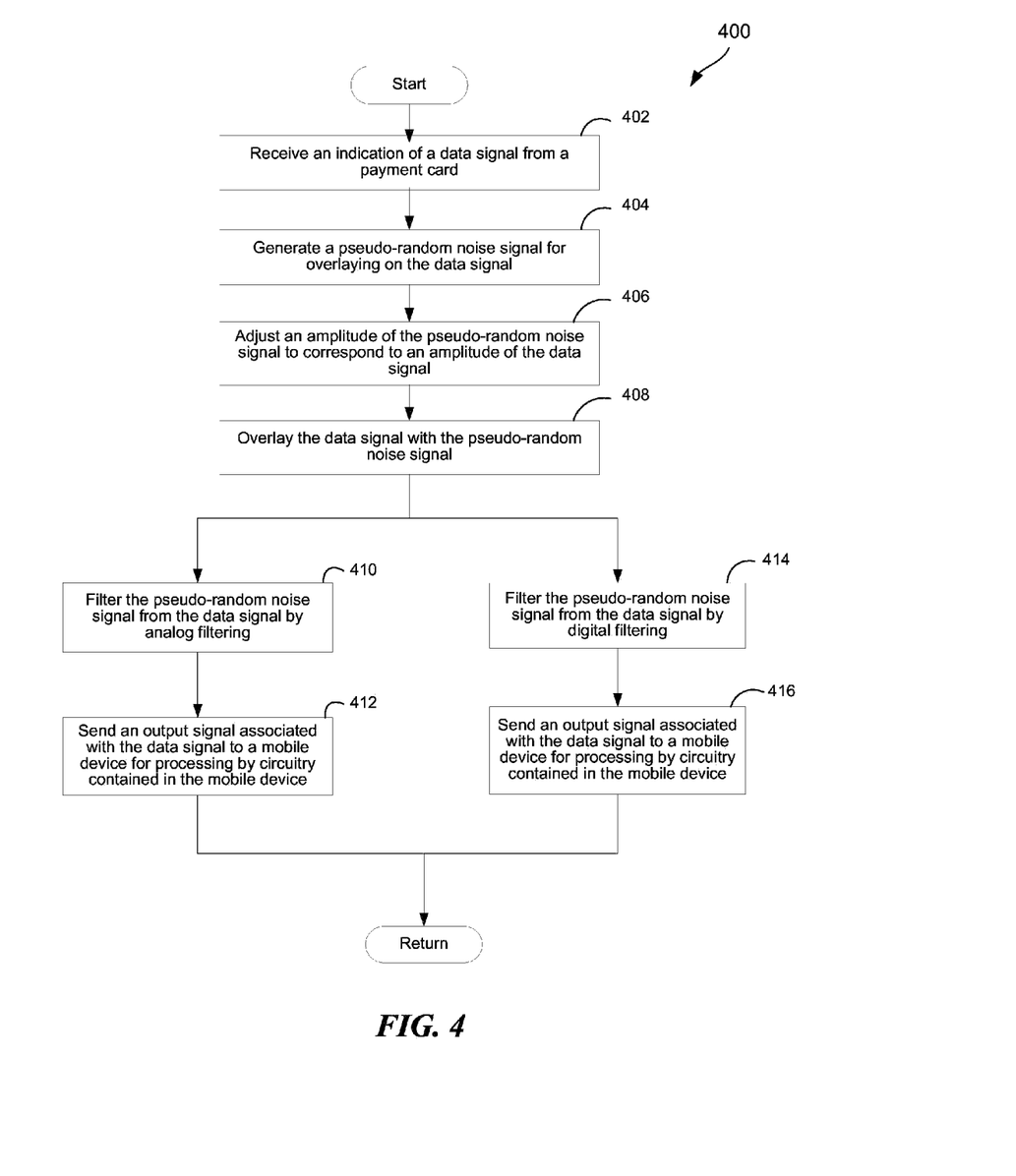
FIG. 4 illustrates an example of a tamper protection process that can be performed by an electronic device.

FIG. 4 illustrates an example of a tamper protection process that can be performed by an electronic device, according to an embodiment of the introduced technique. The process 400 can be executed by, for example, the card reader device 120 of FIG. 1. The process 400 begins at step 402 when the device receives an indication of a data signal from a card, such as a payment card. The indication can be, for example, information that indicates that generation of a data signal is initiated by a flexible circuit board of a read head (e.g., read head 122) coupled to the device, where the data signal is representative of informational content stored on the card. Generation of the data signal can be in response to, for example, a swiping of the payment card. The payment card can be, for example, a conventional credit card, a conventional debit card, or a smart card capable of the functionalities performed by the conventional cards.

Upon receiving the indication of the data signal, the electronic device generates a pseudo-random noise signal for overlay on the data signal, as indicated in step 404. The noise signal can be generated, for example, by the signal generator 300. The electronic device further adjusts the amplitude (e.g., a magnitude or level) of the pseudo-random noise signal to correspond to the amplitude of the data signal, as indicated in step 406. The amplitude adjustment can be done, for example, by the AGC circuit 340 of FIG. 3D. At step 408, the electronic device superimposes, or overlays, the pseudo-random noise signal onto the data signal to generate a composite signal. If an attacker attempts to acquire the sensitive information during transmission of the data signal, the attacker would only detect the composite signal, which in effect is an "encrypted" signal due to the introduction of the noise signal.

The noise signal superimposed onto the data signal in step 408 is filtered out before the data signal is transmitted from the electronic device to another device. In some embodiments, the electronic device removes the noise signal by an analog filtering process, as indicated in steps 410-412. In such embodiments, the electronic device utilizes common mode rejection (i.e., step 410). The amplifier 310, for example, can execute step 410, as discussed above with respect to FIG. 3A. The filtered data signal is then transmitted to e.g., a mobile device, for further processing using the information contained in the filtered data signal, as indicated in step 412. The mobile device can be the handheld mobile device 130 coupled to the card reader 120 for facilitating, for example, a payment transaction.

In some embodiments, the electronic device removes the noise signal by a digital filtering process, as indicated in steps 414-416. In such embodiments, the electronic device, having generated the noise signal in step 404, utilizes the knowledge of various parameter values used in the noise generation to facilitate the decoding, as indicated in step 414. The CPU 126 of FIG. 3B or FIG. 3C can perform step 414. For example, the CPU 126, having specified the "random" pattern of the noise signal and the period of the random pattern, can utilize those parameters to decode the composite signal and retrieve the original data signal. At step 416, the electronic device transmits the original data signal (i.e., the filtered output signal) to another device, e.g., a mobile device that is coupled to the electronic device. The mobile device can be the handheld mobile device 130 coupled to the card reader 120 for facilitating, for example, a payment transaction.

Figure 5:
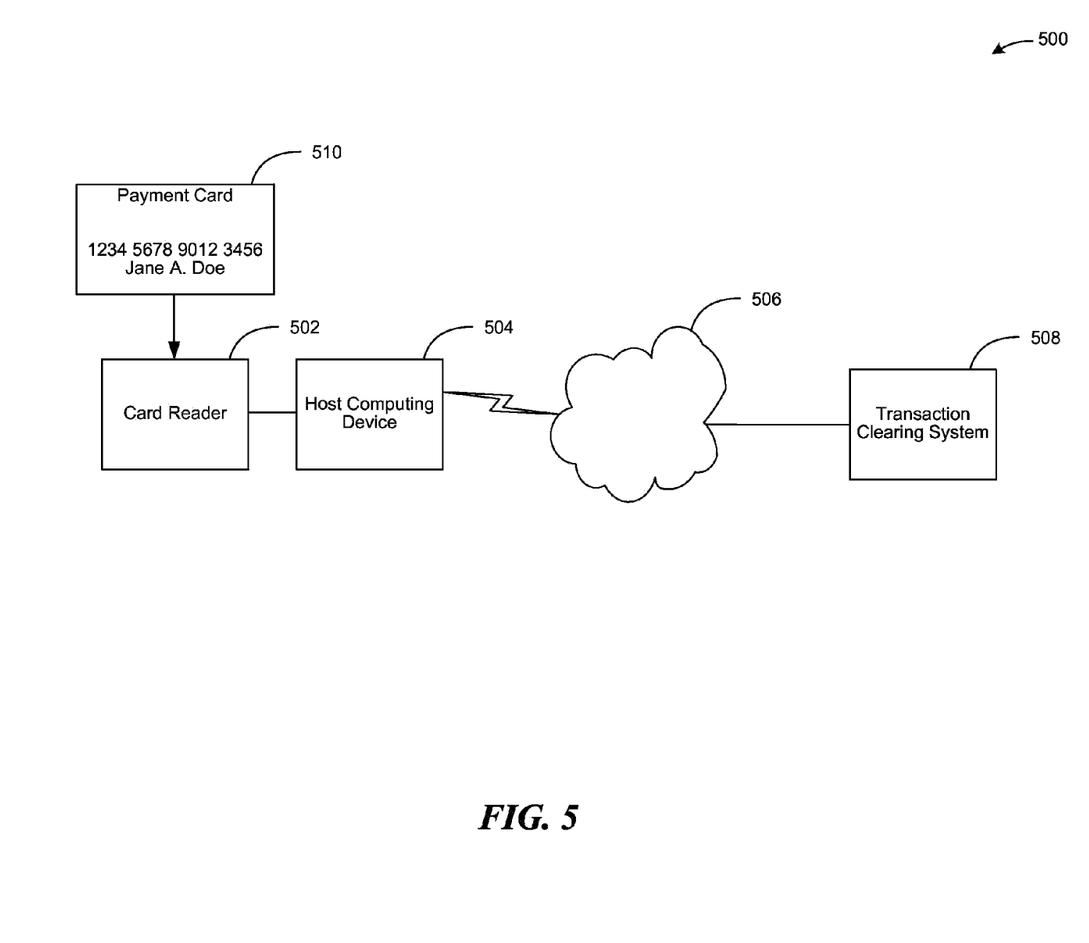
FIG. 5 conceptually illustrates an environment in which a card-based transaction is processed by use of a card reader with built-in tamper protection according to the technique introduced here.

FIG. 5 conceptually illustrates an environment 500 in which an electronic device can operate, where the electronic device can be protected by the tamper protection technique introduced above. The electronic device can be any device capable of receiving, storing, and processing sensitive information. An example device in which the introduced technique would be advantageous is a miniaturized card reader (e.g., card reader 120) designed to be coupled to a handheld mobile device, such as a smartphone or computing tablet. As used here, the term "payment card" refers to a payment mechanism which includes a debit card, a conventional credit card, "smartcards" that have embedded integrated circuit chips (e.g., Europay-MasterCard-Visa (EMV) cards), or any wallet-size card which functions as a combination of any of these payment mechanisms. Such miniaturized payment card readers have been produced to allow merchants to accept payment cards through their smartphones or tablet computers, without the need for a conventional credit card reader or cash register.

The environment of FIG. 5 includes an electronic device 502 that is coupled to a host mobile device 504. The host mobile device 504 may be, for example, a tablet computer or a smartphone, which can belong to a merchant for conducting payment transactions. For example, during a payment card transaction involving the merchant and a consumer, the device 502 reads information from a payment card 510 of the consumer (the "cardholder"). To accomplish this, the device 502 includes a card interface (not shown) which may include a conventional magnetic stripe reader, an EMV chip reader, or other suitable type of card interface or combination of interfaces. The card reader 502 reads information from the card 510, such as the cardholder's name, account number, expiration date and/or personal identification number (PIN) and may provide at least some of this information to the host mobile device 504. The host mobile device 504 communicates via a wireless network 506 with a remote transaction clearing system 508, to authenticate the cardholder and authorize the transaction. The transaction clearing system 508 can include one or more conventional data processing devices, such as one or more server-class computers, personal computers, hand-held devices, etc., some of which may be coupled to each other via one or more networks (not shown).

It will be recognized that the tamper protection technique introduced above can also be applied in the host mobile device 504, the transaction clearing system 508 and/or any other device that is part of the illustrated system.

Figure 6:
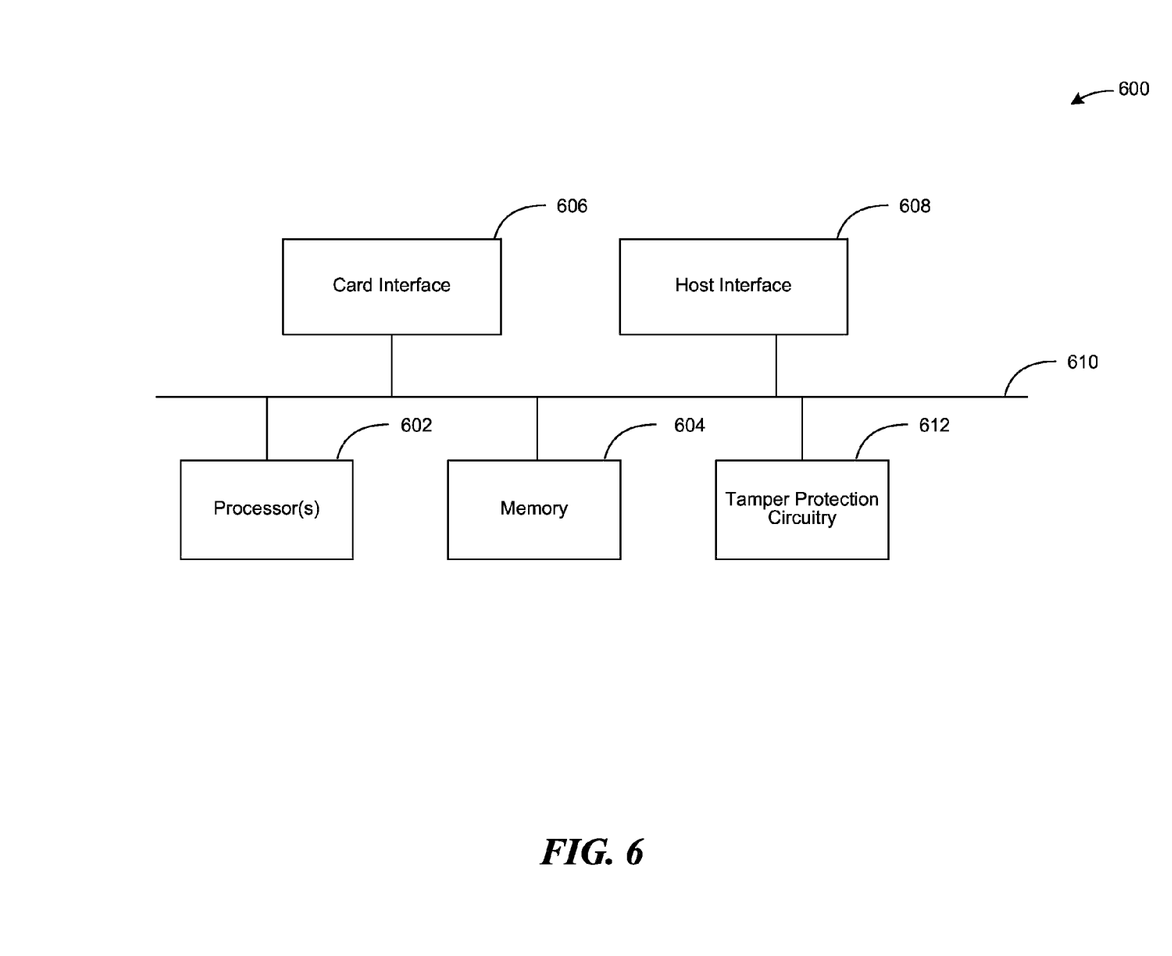
FIG. 6 is a high-level block diagram of an example processing device that can be used to implement various embodiments of the tamper protection technique.

FIG. 6 is a high-level block diagram showing an example processing device 600, such as a card reader 120 of FIG. 1, which can be used to implement various embodiments of the introduced technique. In the illustrated embodiment, the processing device 600 includes one or more processors 602, a memory 604, a card interface 606, and a host interface 608, all coupled to each other through an interconnect fabric 610. The interconnect fabric 610 may include one or more buses, point-to-point connections, controllers, adapters and/or other conventional connection devices.

Also coupled to the processor(s) 602 is tamper protection circuitry 612 that facilitates tamper protection by causing a noise signal to be generated and superimposed on any incoming data signal being received by the processing device 600. Such superimposition can help prevent an attacker from acquiring the informational content of the data signal, as discussed above. The tamper protection circuitry 612 can be the tamper protection circuitry 124 of FIG. 1. The processor(s) 602 may be or include, for example, one or more general-purpose programmable microprocessors, microcontrollers, application specific integrated circuits (ASICs), programmable gate arrays, or the like, or a combination of such devices. The processor(s) 602 can be the processor 126 of FIG. 1, FIG. 3B, or FIG. 3C. The processor(s) 602 control the overall operation of the processing device 600. Additionally, the processor(s) 602 may communicate with the tamper protection circuitry 612 to facilitate the tamper protection. For example, the processor(s) 602 may control the generation of the noise signal, such as specifying the parameter values of the noise signal being generated. The processor(s) 602 may then use those values to decode the composite signal, which includes the noise signal and the original data signal, to extract the data of the data signal for further processing.

Memory 604 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 604 may store data and instructions that configure the processor(s) 602 to execute operations in accordance with the techniques described above.

The card interface 606 may be a conventional magnetic stripe reader, EMV chip reader, or other suitable type of card interface, or combination of such interfaces. The host interface 608 enables the card reader to communicate with the host mobile device 504. In various embodiments, the host interface 608 may provide either a wired or wireless connection to the host mobile device 504. In one embodiment, the host interface 608 includes a connector (not shown) that connects to an audio jack of the host mobile device 504.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A payment card reader with built-in tamper protection, comprising:
    a card interface configured to read data from a magnetic stripe of a payment card during a swipe of the payment card through the payment card reader, the card interface having a first read channel to read a first data signal of the data from a first data track of the magnetic stripe during the swipe;
    a first signal generator configured to generate a first pseudo-random noise signal; and
    a first amplifier circuit having a first input terminal, a second input terminal, and a first output terminal, wherein the first amplifier circuit is configured to:
        receive, at the first input terminal, a first composite signal comprising the first pseudo-random noise signal and the first data signal,
        receive, at the second input terminal, the first pseudo-random noise signal,
        generate a first output signal by filtering the first pseudo-random noise signal from the first composite signal using common mode rejection so that the first pseudo-random noise signal does not appear in the first output signal, and
        output, at the first output terminal, the first output signal.

2. The payment card reader of claim 1, wherein the card interface further comprises a second read channel to read a second data signal of the data from a second data track of the magnetic stripe during the swipe, the payment card reader further comprising:
    a second signal generator configured to generate a second pseudo-random noise signal; and
    a second amplifier circuit having a third input terminal, a fourth input terminal, and a second output terminal, wherein the second amplifier circuit is configured to:
    receive, at the third input terminal, a second composite signal comprising the second pseudo-random noise signal and the second data signal,
    receive, at the fourth input terminal, the second pseudo-random noise signal,
    generate a second output signal by filtering the second pseudo-random noise signal from the second composite signal using common mode rejection so that the second pseudo-random noise signal does not appear in the second output signal, and
    output, at the second output terminal, the second output signal.

3. The card reader of claim 2, wherein the first signal generator and the second signal generator are such that the first pseudo-random noise signal and the second pseudo-random noise signal include non-identical noise patterns.

4. An electronic device comprising:
    a card interface configured to read data from a magnetic stripe of a payment card during a swipe of the payment card through the electronic device and to generate a data signal that represents the data read from the magnetic stripe of the payment card;
    an integrated circuit configured to generate a pseudo-random noise signal and to introduce the pseudo-random noise signal to the data signal; and
    an amplifier configured to:
        receive, at a first input terminal, a composite signal including the pseudo-random noise signal and the data signal that represents the data read from the magnetic stripe of the payment card,
        receive, at a second input terminal, the pseudo-random noise signal,
        generate an output signal based on the data signal that represents the data read from the magnetic stripe of the payment card, and
        output, at an output terminal, the output signal.

5. The electronic device of claim 4, further comprising:
    a processor coupled to the integrated circuit and configured to trigger generation of the pseudo-random noise signal,
        adjust a parameter value of the pseudo-random noise signal, and
        filter the pseudo-random noise signal from the data signal by decoding the output signal in a particular manner based on the parameter value.

6. The electronic device of claim 4, wherein the pseudo-random noise signal is a pseudo-random bit sequence.

7. The electronic device of claim 5, wherein the parameter value comprises any of a timing value, a randomness value, a frequency value, a spectrum value, a magnitude value, or some combination thereof.

8. The electronic device of claim 4, further comprising:
    a configuration circuit coupled to the integrated circuit and configured to adjust the pseudo-random noise signal based on attributes of the amplifier.

9. The electronic device of claim 8, wherein the configuration circuit includes high pass filter components and resistor divider components that allow the configuration circuit to convert the pseudo-random noise signal from a digital signal to an analog signal.

10. The electronic device of claim 4, further comprising:
    an amplitude control unit coupled to the integrated circuit and configured to adjust a magnitude of the pseudo-random noise signal based on an amplitude of the data signal generated during the swipe.

11. The electronic device of claim 10, wherein the amplitude control unit is an automatic gain control unit configured to adjust a gain of the pseudo-random noise signal so that the magnitude of the pseudo-random noise signal corresponds to the amplitude of the data signal generated during the swipe.

12. The electronic device of claim 4, wherein the card interface includes a plurality of read channels to read a plurality of data signals of the data from a plurality of data tracks of the payment card during the swipe, and wherein each of the plurality of data signals is sent to the amplifier.

13. A method comprising:
    receiving a data signal at an input terminal of an electronic device;
    protecting content of the data signal against potential acquisition of the content by an unauthorized entity between the input terminal and an output terminal of the electronic device by:

generating an interference signal by an integrated circuit;

combining, by the integrated circuit, the interference signal with the data signal at a point between the input terminal and the output terminal of the electronic device to form a composite signal;

filtering the interference signal from the composite signal to create a filtered data signal at the output terminal; and transmitting the filtered data signal to a mobile device coupled to the electronic device.

14. The method of claim 13, wherein said filtering is carried out by applying common mode rejection in relation to two input terminals in the electronic device.

15. The method of claim 13, wherein said generating comprises generating the interference signal based on a first command from a processor configured to trigger generation of the interference signal by the integrated circuit, and wherein said filtering comprises filtering the interference signal from the composite signal by decoding the composite signal based on a second command from the processor.

16. The method of claim 15, wherein said decoding is performed using parameters utilized in said generating of the interference signal.

17. The method of claim 13, wherein the interference signal is a Gaussian noise signal.

18. The method of claim 13, further comprising:

adjusting, by an automatic gain control circuit, a magnitude of the interference signal to correspond to an amplitude of the data signal.

19. The method of claim 13, wherein the electronic device is a card reader configured to read data from a payment card during a swipe of the payment card through the card reader.

20. The method of claim 19, wherein the data signal represents the data stored on the payment card.

* * * * *